United States Patent [19]

York

[11] Patent Number: 4,998,573
[45] Date of Patent: Mar. 12, 1991

[54] TREE CUTTING APPARATUS

[76] Inventor: Norman N. York, P.O. Box 262364, Houston, Tex. 77207

[21] Appl. No.: 439,285

[22] Filed: Nov. 17, 1989

[51] Int. Cl.$^5$ .............................................. A01G 23/08
[52] U.S. Cl. ................................... 144/34 R; 83/490; 83/928; 30/379.5; 144/3 D; 144/235; 144/241; 144/336
[58] Field of Search .................. 83/490, 928; 30/379, 30/379.5; 144/2 N, 3 D, 34 R, 241, 235, 336; 37/2 R

[56] References Cited

U.S. PATENT DOCUMENTS

| 892,895 | 7/1908 | Rose | 83/490 |
|---|---|---|---|
| 2,378,554 | 6/1945 | Irwitz, Jr. | 83/743 |
| 2,462,314 | 2/1949 | Fugua | 30/379 |
| 2,474,037 | 6/1949 | Cuthrell | 37/2 B |
| 2,542,952 | 2/1951 | White | 144/34 R |
| 2,664,925 | 1/1954 | Jacobs et al. | 144/34 R |
| 2,672,171 | 3/1954 | Jones | 144/34 R |
| 2,695,041 | 11/1954 | LeTourneau | 144/34 R |
| 2,787,298 | 4/1957 | LeTourneau | 144/34 R |
| 3,818,957 | 6/1974 | Schoonover | 144/34 R |
| 4,090,540 | 5/1978 | Smith et al. | 144/34 R |
| 4,437,500 | 3/1984 | Larose | 144/34 R |
| 4,530,385 | 7/1985 | York | 144/2 N |
| 4,621,668 | 11/1986 | York | 144/2 N |
| 4,681,145 | 7/1987 | York | 144/2 N |
| 4,759,394 | 7/1988 | Clemenson | 144/235 |

Primary Examiner—W. Donald Bray
Attorney, Agent, or Firm—Gunn, Lee & Miller

[57] ABSTRACT

A tractor supported and driven tree cutting apparatus which causes linear movement of a rotary cutter for cutting a tree trunk from the side portions thereof. The apparatus incorporates a frame structure having a hydraulically driven slide support guided by parallel structural members of the frame. The rotary cutter is rotatably supported by the slide structure and is driven by the power take-off of the tractor which is operatively connected to a drive gear mechanism connected to the rotary cutter. The rotary cutter includes cutting teeth angularly mounted about the periphery thereof for cutting the tree trunk below ground level.

12 Claims, 4 Drawing Sheets

TREE CUTTING APPARATUS

BACKGROUND OF THE INVENTION

This invention relates generally to apparatus for removing trees and, more particularly, is directed to a tree cutting apparatus utilizing a circular horizontally positioned saw for severing a tree or the like below ground level.

After trees have been cut, such as during tree harvesting operations or land clearing operations, there typically remains a section of a tree stem extending above the surface of the ground. This section of the tree stem, typically referred to as a tree stump, results due to cutting of the tree at a level above the ground where the trunk or stem of the tree begins to taper outwardly to the root portion thereof. In many cases, tree stumps are left for natural environmental decomposition (such as weather, insects and the like). Tree stumps are also removed by explosives, although this is a dangerous and expensive practice.

Should it become desirable to use the ground surface before the tree stumps have time for natural decomposition, the tree stumps can present a hazard to the intended user. It is, therefore, desirable to accomplish efficient removal of the tree to a level at or slightly below the grade level of the ground without leaving a tree stump for subsequent removal. Of course, it is desirable to accomplish such removal of a tree without causing undo disturbance of the ground, such as would occurred during stump removal by such mechanical implements as dozers, or by blasting, etc.

As is clear from a review of the prior art, many different types of stump removers have been developed. For the most part, these devices are of complicated and expensive construction. The stump removal apparatus of Bartlett (U.S. Pat. No. 2,887,134) and Pickel (U.S. Pat. No. 3,732,905) are supported by the three-point hitch structure of a tractor and driven by the power take-off system of the tractor. U.S. Pat. No. 2,912,022 to Ver Ploeg, et al., shows a tractor drawn wheel mounted stump cutter device, U.S. Pat. No. 2,927,613 to Franzen, et al., shows a tractor supported stump grinder having plural saw blades for cutting of the stump. U.S. Pat. No. 3,028,691 to Jeffres discloses a tractor supported apparatus having a chain type cutter driven in rotary manner. Other stump cutting devices of interest are disclosed by U.S. Pat. Nos. 3,044,509 to Kehler, 3,308,860 to Deshano, 3,568,740 to Speakman, 3,911,979 to Rousseau, and 4,271,879 to Shivers, Jr., et al.

Tree cutting apparatus are also well known in the prior art. The tree cutting apparatus of Smith et al. (U.S. Pat. No. 4,090,540) is connected to a tractor which supplies power for the saw and may be lifted from the ground for transport by the tractor. The power driven saw is guided along a frame which is supported on the ground at a selected angle of tilt so that the saw may be projected downwardly at an angle to cut a tree partially below ground level. Other tree cutting apparatus of interest are disclosed by U.S. Pat. Nos. 2,542,952 to White, 2,787,298 to Le Tourneau, 3,818,957 to Schoonover, and 4,437,500 to Larose.

SUMMARY OF THE INVENTION

Accordingly, it is a primary feature of the present invention to provide novel tree cutting apparatus which may be supported, raised, lowered and driven by a conventional tractor having a three-point hitch.

It is also a feature of this invention to provide novel a tree cutting apparatus which is capable of efficiently severing a tree at or slightly below grade level.

It is an important feature of this invention to provide a novel tree cutting apparatus which is supported by the three-point hitch of a standard tractor and is driven by the power take-off system of the tractor, thus minimizing the mechanical requirements and expense of the mechanism.

Briefly, tree cutting apparatus constructed in accordance with the present invention incorporate a frame structure adapted for generally horizontal positioning relative to the ground surface and form a pair of generally parallel elongated frame members which comprise a portion of the frame structure. A slide structure is provided with slide channels at opposite sides thereof for sliding engagement with the elongated frame members. One or more hydraulic cylinders are fixed to the frame structure with operating shafts thereof in driving connection with the slide structure, thus being adapted to impart linear movement to the slide structure upon being energized through control of the hydraulic system. A rotary cutter having tree trunk milling or cutting teeth removable fix thereon is supported on the slide surface and is, therefore, movable along with the slide structure. The cutter is adapted to mill or cut away a tree trunk from one side thereof as the cutter is simultaneously rotated and moved linearly by hydraulically induced movement of the slide structure. The cutter is capable of severing the tree trunk at or slightly below ground level.

The rotary cutter is in the form of a metal plate having a plurality of wood cutting or shredding teeth projecting from the planar side thereof and the peripheral portion of the cutter. Some of the cutter teeth are angularly arranged relative to the planar surface of the cutter about the peripheral portion thereof. Thus, the cut made through the tree trunk is larger than the thickness of the cutter plate 80. A tree support pivotally mounted to the frame structure engages and maintains the tree in a substantially vertical position so it does not bind the rotary cutter as the tree trunk is being cut. Upon completion of the cut, the tree support is hydraulically moved forwardly to push the tree over and away from the apparatus.

The hydraulic system of the tree cutting apparatus is connected to the tractor hydraulic system. The hydraulic system of the apparatus is a closed loop system including a pair of double acting cylinders mounted to the frame structure.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are, therefore, not to be considered limiting of its scope, for the invention may admit to other equally effective embodiments.

DETAILED DESCRIPTION OF THE PREFERRED EMBODIMENT

Figure 1:
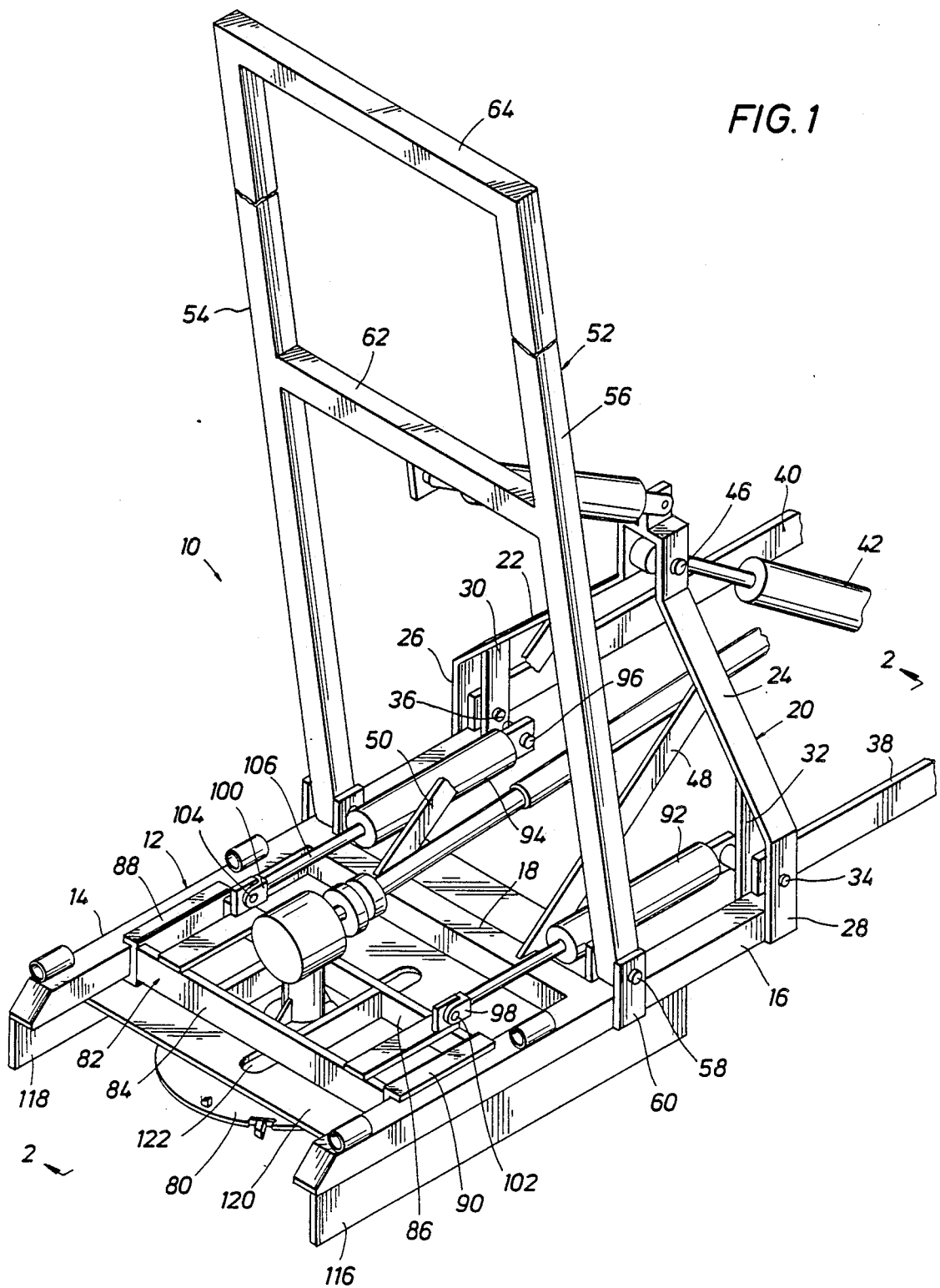
FIG. 1 is a partial perspective view illustrating a tractor supported and operated tree cutting apparatus constructed in accordance with the present invention.
Figure 2:
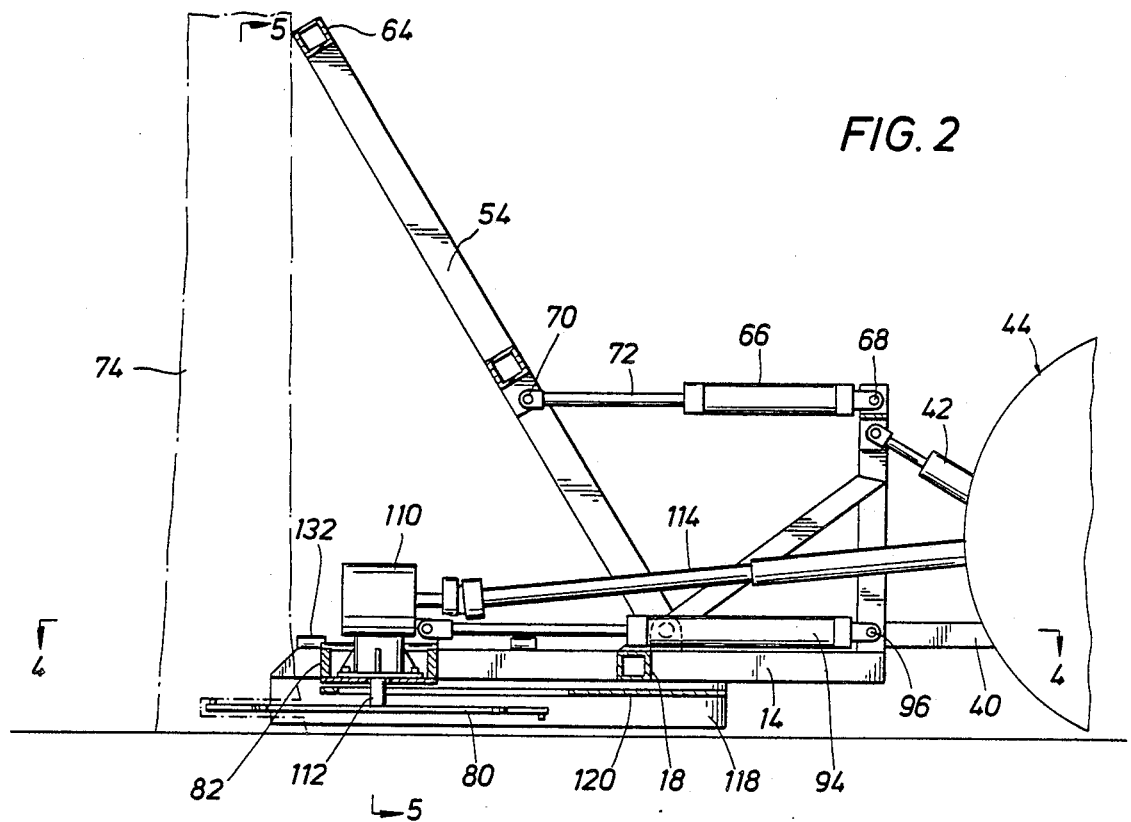
FIG. 2 is a sectional view of the tree cutting apparatus of the invention taken along line 2—2 of FIG. 1.
Figure 3:
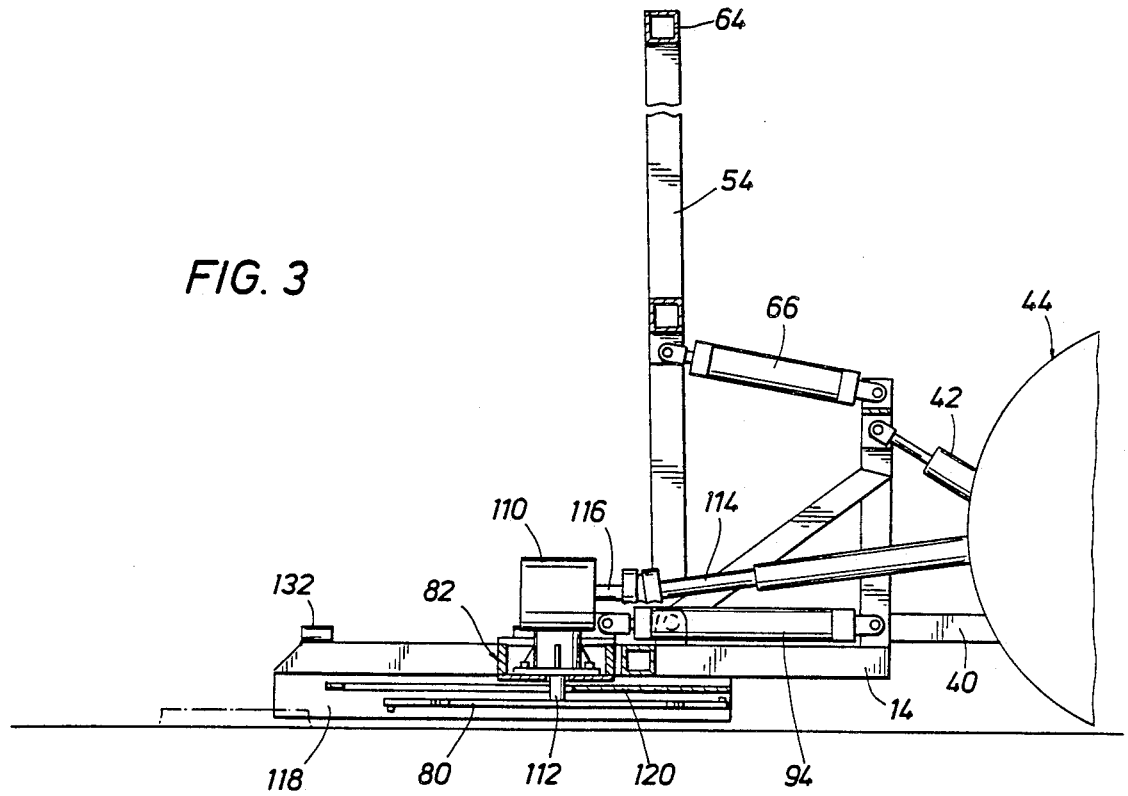
FIG. 3 is a sectional view of the tree cutting apparatus of the invention similar to the view of FIG. 2 showing the rotary cutter of the invention in its retracted position.
Figure 4:
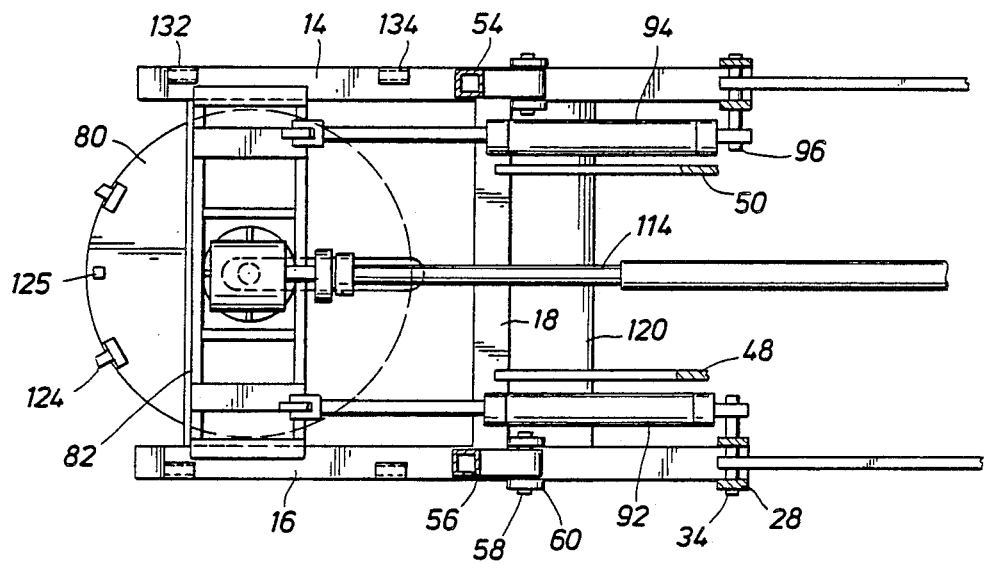
FIG. 4 is a partial broken away top plan view of the tree cutting apparatus of the invention taken along line 4—4 of FIG. 2.
Figure 5:
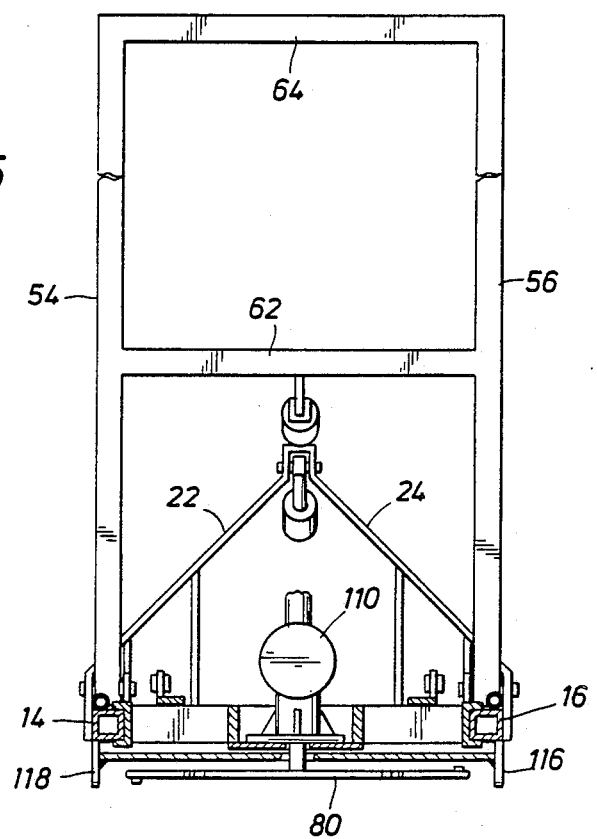
FIG. 5 is an end view of the tree cutting apparatus of the invention taken along line 5—5 of FIG. 2.

Referring first to FIG. 1 of the drawings, the tree cutting apparatus of the invention is generally identified by the reference numeral 10. The apparatus 10 includes a support frame structure generally designated by the reference numeral 12. The frame structure 12 is formed by frame members 14 and 16 connected by a cross member 18. The frame members 14 and 16 are substantially parallel and are connected by the cross member 18 at approximately the mid-point thereof to form the generally H-shaped frame structure 12. The support frame 12 is adapted to connection to a three-point hitch assembly illustrated generally by the referenced numeral 20. The hitch assembly includes a pair of inclined load transmitting members 22 and 24 terminating in end portions 26 and 28 which are connected to the ends of the frame members 14 and 16, respectively by welding or the like. Brace members 30 and 32 are fixedly secured, by welding or the like, between the load transmitting members 22 and 24 and the inner ends of the frame members 14 and 16 and cooperate with the ends 26 and 28 of the load transmitting members 22 and 24 for forming clevis-like connecting structures about the ends of the frame members 14 and 16. A pair of connecting pins 34 and 36 extend through the members 26, 28, 30 and 32 for connection of tractor hitch operating bars 38 and 40 to the three-point hitch assembly 20. The hitch operating bars 38 and 40 form a part of the tractor hitch structure, as does the hydraulic lift bar assembly 42. In FIG. 2 and 3, the tractor is generally identified by the reference numeral 44. A connecting pin 46 extends through apertures in the upper parallel extremities of the load transmitting members 22 and 24, thus providing for connection of the hydraulic lift bar assembly 42 of the tractor 44 to the upper portion of the three-point hitch assembly 20. Additional structural support is provided by brace members 48 and 50 which extend between the load transmitting members 22 and 24 and the transverse structural member 18, thereby rigidly securing the hitch assembly 20 to the support frame 12 to form a unitary frame structure which may be lifted and lowered by the tractor 44.

Referring again to FIG. 1, a tree engaging frame 52 is shown pivotally mounted to the support frame structure 12. The frame 52 includes a pair of spaced leg members 54 and 56 pivotally connected to the frame members 14 and 16, respectively, about connecting pins 58 which extend through upstanding flange members 60 which are welded to the frame members 14 and 16. Rigidity for the frame 52 is provided by cross members 62 and 64 which extend between the leg members 54 and 56 and are connected thereto. An extendable hydraulic cylinder assembly connects the frame 52 to the hitch assembly 20. The hydraulic cylinder assembly 66 is pivotally connected to the hitch assembly 20 at 68 and to the frame cross member 62 at 70. The cylinder assembly 66 is positioned to advance the piston rod 72 forwardly for positioning the frame 52 for engagement with a tree trunk 74 which is to be felled. In the trunk engaging position shown in FIG. 2, the cross member 64 engages the tree trunk 74 so that when the tree is being cut, the cylinder assembly 66 is operated to force the tree to fall in a direction away from the apparatus 10 and tractor 44 to ensure the safety of personnel operating the equipment and prevent damage to the apparatus 10 and tractor 44.

The support frame structure 12 supports a cutter plate 80 slideably mounted thereon. The cutter plate 80 is supported between the frame members 14 and 16 by a slide structure 82. The slide structure 82 comprises a pair of transverse members 84 and 86 connected to a pair of slides 88 and 90 to form the substantially rectangular slide structure 82. The slides 88 and 90 form a U-shaped channel in cross section profiled to the size and shape of the frame members 14 and 16 so that the slide structure 82 is supported by the frame members 14 and 16. Hydraulic cylinders 92 and 94 slideably connect the slide structure 82 to the support frame 12. The rear ends of the cylinders 92 and 94 are connected to the brace members 30 and 32 by connecting pins 96. The forward ends of the cylinders 92 and 94 define clevis-like connections 98 and 100. Connecting pins 102 and 104 extend through side members of the clevis connections 98 and 100, thereby connecting the forward end of the cylinders 92 and 94 to the slide structure 82.

Each of the cylinders 92 and 94 define an internal, cylindrical cavity which is divided by a piston. Piston rods 106 extend from the forward ends of the cylinders 92 and 96 terminating in the clevis connections 98 and 100. Thus, as the hydraulic cylinders 92 and 94 are energized responsive to selection by the tractor operator, the piston rods 106 of the cylinders 92 and 94 impart linear movement to the slide structure 82 for advancing the cutter plate 80 forwardly.

The cutter plate 80 is rotatably supported between the frame members 14 and 16 by means of a gear assembly 110 secured to the slide structure 82. Thus, the gear assembly 110 and cutter plate 80 move linearly as the slide assembly 82 is moved upon energization of the hydraulic cylinders 92 and 94. A drive shaft 112 connects the cutter plate 80 to the gear assembly 110. The gear assembly 110 is drivingly connected to the power take-off shaft 114 extending from the power take-off of the tractor 44. The drive shaft 114 is connected to the shaft 116 of the gear assembly 110 by a universal joint in order to accommodate any shaft misalignment that might occur.

The cutter plate 80, in the fully retracted position shown in FIGS. 1 and 3, is substantially enclosed by the support frame structure 12. Side members 116 and 118 which extend downwardly from the frame members 14 and 16 and the cover plate 120 which extends between the frame members 14 and 16, form an enclosure substantially surrounding the cutter plate 80. The ground engaging side members 116 and 118 position the cutter plate 80 so that it is substantially at ground level when positioned to cut a tree or the like. The cover 120 includes a slot 122 formed therein permitting the cutter plate 80 to be freely advanced or retracted. The cover 120 is secured to the inner surface of the side walls 116 and 118, as best shown in FIG. 3, slightly below the slide assembly 82 so that it does not impede advancement of the slide assembly along the frame members 14 and 16. The enclosure formed by the side members 116 and 118 and the cover plate 120 also prevents the ejection of a substantial portion of wood chips and debris, thus insuring that the operator of the tractor 4 is not in danger of flying wood chips and debris.

The cutter plate 80 is provided with a plurality of cutter teeth. The cutter plate 80 is a circular steel disk approximately one inch thick. The cutter teeth are spaced about the periphery thereof and are arranged in such a manner to form a cut through a tree greater than the thickness of the cutter plate 80. To this end, some of the cutter teeth project from the cutter plate 80 angularly downwardly and some are oriented to projected angularly upwardly. A set of cutter teeth mounted to the cutter plate 80 project horizontally outwardly beyond the periphery of the cutter plate 80. An additional set of cutter teeth project upwardly and downwardly substantially perpendicular to the planar surface of the cutter plate 80. Arrangement of the cutter teeth in this manner permits the apparatus 10 of the present invention to cut a tree slightly below ground level when the apparatus 10 is positioned so that the side walls 116 and 118 rest on the ground.

Figure 7:
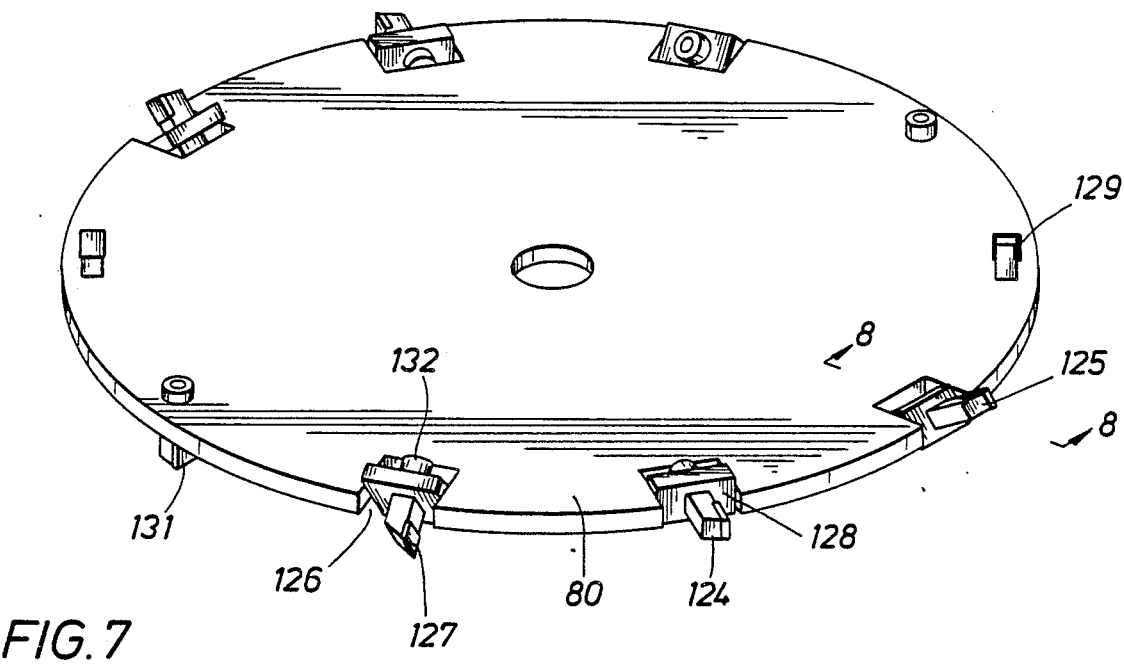
FIG. 7 is a perspective view of the cutter plate 80 of the invention.
Figure 8:
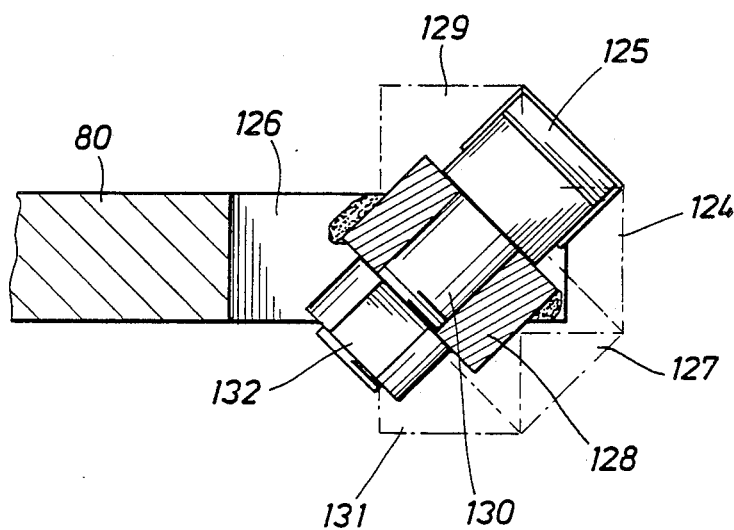
FIG. 8 is a partial broken away sectional review of a cutting tooth mounted on the cutter plate 80.

As is evident from FIGS. 7 and 8, the cutter plate 80 is provided with a plurality of cutter teeth which are removably secured thereto in accordance to a predetermined pattern. The pattern of the teeth is such as to insure that the cutter plate 80 is balanced as it rotates. That is, there is a total of 10 teeth secured to the cutter plate 80. The teeth are arranged in pairs which are oppositely positioned on the cutter plate 80.

The cutter teeth are removably assembled to the cutter plate 80 so that they may be simply and efficiently replaced in the event they become worn or broken. As mentioned above, the tree cutting apparatus 10 is capable of cutting to a level below ground in which case the cutter teeth are subject to abrasion by sand, dirt and other debris of the ground. Although the cutter teeth are hardened and efficiently withstand abrasion and erosion, nevertheless, provision must be provided for replacement in the event they become sufficiently worn that cutting activity diminish. The cutter plate 80 must also be capable of cutting beyond the outer periphery of the cutter plate 80. To facilitate such cutting activity, the cutter teeth are spaced about the periphery of the cutter plate 80 in such a manner to enable cutting beyond the outer periphery of the cutter plate 80. As shown in FIGS. 7 and 8, the cutter teeth 125 and 127 are inclined forwardly and rearwardly at an angle of approximately 45° in relation to the plane of the cutter plate 80. In addition, a pair of cutter teeth 124 lie in the plane of the cutter plate 80 and project beyond the periphery thereof. The cutter plate 80 is formed to define periphery recesses 126 and a transverse cutter support member 128 is fixed within an outer portion of the recess 126 such as by a welding or the like with the angle of the support member controlling the cutter tooth position. The support member 128 forms an aperture through which extends a shank portion 130 of the cutter teeth. A nut 132 received by the threaded shank 130 is tightened to secure the cutter teeth in substantially immovable relation with the support element 128. It should be born in mind that the cutter teeth 124, 125, 127, 129 and 131 are substantially identical.

Figure 6:
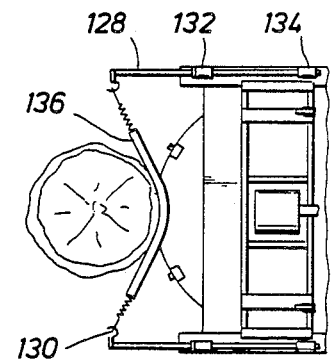
FIG. 6 is a partial, top plan view of the tree cutting apparatus of the invention showing a tree engaging attachment mounted thereon.

The apparatus 10 of the present disclosure may also be used to cut tree stamps or the like where a portion of the tree has been felled, as for example by high winds during a hurricane. In those circumstances, a sufficient portion of the tree may not be remaining for engagement by the frame 52. An attachment is therefore provided, as shown in FIG. 6, for applying a force against the tree trunk while cutting with the cutter plate 80. The attachment comprises a pair of rods 128 provided with hooks 130 extending from the distal ends thereof. The rods 128 are received through cylindrical receptacles 132 and 134 mounted on the frame members 14 and 16. The receptacle 132 is opened at both ends so that the rod 128 extends there through and into the receptacle 134 which is closed at the back end thereof. A coil spring 136 or other flexible member is stretched between the rods 128 and hooked on the hooks 130. When the apparatus 10 is positioned next to the tree trunk, the rods 128 project on opposites of the tree trunk so that the spring 136 engages and provides a force against the tree trunk as shown in FIG. 6. As the cutter plate 80 is advanced, the spring 136 exerts a force against the tree trunk to prevent it from binding the cutter plate 80 and to force it away from the apparatus 10 as the cut is completed.

Use of the apparatus 10 of the present disclosure is conveniently accomplished by the tractor operator without leaving the tractor 44. The hydraulic drives mounted on the frame structure 12 are connected to the tractor hydraulics (not shown in the drawings). Therefore, the apparatus 10 may be raised or lowered by the tractor operator by manipulation of the tractor hydraulic controls. Upon positioning of the frame structure 12 on the ground adjacent to a tree to be cut, the hydraulic cylinders 92 and 94 are energized by the tractor operator to advance the slide assembly 82 and cutter plate 80 toward the tree. Upon completion of the cut, the apparatus 10, is lifted transported and again positioned for removal of the next tree.

It is, therefore, seen that this invention is one well adapted to obtain all of the objects and advantages hereinabove set forth. It will be understood that certain combinations and sub-combinations are of utility and may be employed without reference to other features and sub-combinations. This is contemplated by and is within the scope of the present invention.

As many possible embodiments may be made of this invention without departing from the spirit or scope thereof. It is to be understood that all matters hereinabove set forth or shown in the accompanying drawings are to be interpretated as illustrative and not in any limiting sense.

What is claimed is:

1. Tractor supported and operated tree cutting apparatus, comprising:
    (a) a frame structure adapted to be supported, raised and lowered by a hitch structure of the tractor;
    (b) slide means positioned for guided reciprocal movement on said frame structure;
    (c) hydraulic means for imparting linear reciprocal movement to said slide means;

(d) drive shaft means mounted for rotary movement on said frame structure and adapted to be driven by the power takeoff of the tractor;

(e) a rotary cutter rotatably supported by said slide means and moveable along with said slide means, said rotary cutter being rotated by said drive shaft means and capable of simultaneous linear movement, wherein said rotary cutter is horizontally oriented for cutting a tree at or below level; and (f) wherein said rotary cutter is substantially enclosed by a cover plate and sidewalls mounted on said frame structure, said cover plate including a longitudinally extending slot formed therein permitting said rotary cutter to be advanced relative thereto.

2. The apparatus of claim 1 wherein said frame structure comprises interconnected frame members slideably supporting said slide means for positioning said rotary cutter substantially parallel to ground level.

3. The apparatus of claim 1 wherein said rotary cutter comprises a substantially circular planar plate having a plurality of cutting teeth mounted about the periphery thereof, said cutting teeth projecting angularly therefrom for forming a cut through the trunk of a tree larger than the cross sectional thickness of said cutter plate.

4. The apparatus of claim 3 wherein said rotary cutter includes peripheral recess means for receiving a tooth support member angularly mounted within said recess means for angularly positioning said cutting teeth with respect to said cutter plate.

5. The apparatus of claim 4 wherein said cutting teeth are removably mounted on said support member and define a cutting profile extending radially outwardly beyond the outer periphery of said rotary cutter.

6. The apparatus of claim 5 wherein said rotary cutter includes at least two pair of angularly positioned cutting teeth.

7. The apparatus of claim 3 wherein said rotary cutter includes at least five pair of cutting teeth oppositely positioned above the periphery of said rotary cutter.

8. The apparatus of claim 7 wherein said five pair of cutting teeth include one pair extending substantially perpendicularly upwardly and a second pair of cutting teeth extending substantially perpendicularly downwardly with respect to said cutter plate.

9. The apparatus of claim 8 wherein said cutting teeth include a pair of cutting teeth lying in a plane defined by said cutter plate and projecting beyond the periphery thereof.

10. The apparatus of claim 1 including a tree engaging member pivotally mounted on said frame structure for engaging the tree being cut and forcing the tree to fall away from said support frame upon severing the tree at or below ground level.

11. The apparatus of claim 10 wherein said tree engaging member is actuated by a hydraulic cylinder assembly mounted on said frame structure.

12. Tractor supported and operated tree cutting apparatus, comprising:

(a) a frame structure adapted to be supported, raised and lowered by a hitch structure of the tractor;

(b) slide means positioned for guided reciprocal movement on said frame structure;

(c) hydraulic means for imparting linear reciprocal movement to said slide means;

(d) drive shaft means mounted for rotary movement on said frame structure and adapted to be driven by the power takeoff of the tractor;

(e) a rotary cutter rotatably supported by said slide means and moveable along with said slide means, said rotary cutter being rotated by said drive shaft means and capable of simultaneous linear movement; and (f) sidewall support means extending downwardly from said frame structure for positioning said rotary cutter substantially at ground level and parallel therewith for cutting a tree at or below ground level.

* * * * *